US00RE50647E

(19) United States
(12) Reissued Patent
Bernard et al.

(10) Patent Number: US RE50,647 E
(45) Date of Reissued Patent: Oct. 21, 2025

(54) EDGE LIT FIXTURE

(71) Applicant: CREE LIGHTING USA LLC, Racine, WI (US)

(72) Inventors: Randy Bernard, Conshohocken, PA (US); Nathan Snell, Raleigh, NC (US)

(73) Assignee: CREE LIGHTING USA LLC, Racine, WI (US)

(21) Appl. No.: 18/229,742

(22) Filed: Aug. 3, 2023

Related U.S. Patent Documents

Reissue of:
(64) Patent No.: 11,079,076
Issued: Aug. 3, 2021
Appl. No.: 14/526,368
Filed: Oct. 28, 2014

(51) Int. Cl.

| | |
|---|---|
| ***F21S 8/02*** | (2006.01) |
| ***E04B 9/00*** | (2006.01) |
| ***F21S 4/28*** | (2016.01) |
| ***F21V 5/04*** | (2006.01) |
| ***F21V 15/01*** | (2006.01) |
| ***F21V 17/00*** | (2006.01) |

(Continued)

(52) U.S. Cl.
CPC ..... *F21S 8/026* (2013.01); *E04B 9/006* (2013.01); *F21S 4/28* (2016.01); *F21V 5/04* (2013.01); *F21V 15/01* (2013.01); *F21V 17/007* (2013.01); *F21Y 2103/10* (2016.08); *F21Y 2115/10* (2016.08)

(58) Field of Classification Search
CPC ..... E04B 9/006; F21V 7/0008; F21V 15/01; F21V 5/04; F21V 17/007; F21S 8/046; F21S 8/026; F21S 4/28; F21S 5/026; F21Y 2103/10; F21Y 2115/10
See application file for complete search history.

(56) References Cited

U.S. PATENT DOCUMENTS 3,113,728 A 12/1963 Boyd
3,816,880 A * 6/1974 Jacobs ..... E04B 9/006 362/150

(Continued)

FOREIGN PATENT DOCUMENTS

DE 102012006887 10/2012
DE 102012006887 A1 10/2012

(Continued)

OTHER PUBLICATIONS

Author Unknown, "Cree LMR4 LED Module with TrueWhite Technology," Product Family Data Sheet, CLM-D501 LMR4, Revision 6A, 2014, Cree, Inc., 2 pages.

(Continued)

*Primary Examiner* — William C Doerrler
(74) *Attorney, Agent, or Firm* — J. Clinton Wimbish; Maynard Nexsen PC

(57) ABSTRACT

An edge lit fixture. A housing provides the basic shape and structure of the fixture. The housing is constructed from discrete segments including lens frames, side frames, and end frames, which can be used in many different combinations to create the desired fixture. The assembled housing defines an open central area. One or more light panels are arranged around the perimeter of the housing such that at least some of the light is emitted toward the central area. The open central area of the housing allows for existing materials, such as a ceiling tile, for example, to function as a back surface of the fixture.

28 Claims, 8 Drawing Sheets

(51) Int. Cl.
*F21Y 103/10* (2016.01)
*F21Y 115/10* (2016.01)

(56) References Cited

U.S. PATENT DOCUMENTS

| | | | | |
|---|---|---|---|---|
| 4,175,281 | A * | 11/1979 | Lonseth | F21S 8/02 248/320 |
| 4,933,820 | A | 6/1990 | Engel | |
| 5,823,663 | A | 10/1998 | Bell et al. | |
| 6,079,851 | A | 6/2000 | Altman et al. | |
| 6,179,451 | B1 * | 1/2001 | Bodine | E04B 9/001 362/147 |
| 6,210,025 | B1 | 4/2001 | Schmidt et al. | |
| 6,945,668 | B1 * | 9/2005 | Orlov | F21S 8/04 362/147 |
| 7,213,940 | B1 | 5/2007 | Van de Ven et al. | |
| 7,506,994 | B1 * | 3/2009 | Waycaster | F21S 2/00 362/147 |
| 7,768,192 | B2 | 8/2010 | Van de Ven et al. | |
| 7,954,975 | B2 | 6/2011 | Zhou | |
| 8,096,671 | B1 * | 1/2012 | Cronk | F21S 2/005 362/147 |
| 8,220,955 | B2 * | 7/2012 | Kwak | F21V 7/0008 362/217.05 |
| 8,523,388 | B2 | 9/2013 | Wu | |
| 8,686,429 | B2 | 4/2014 | Bergmann et al. | |
| 9,062,838 | B1 * | 6/2015 | Merrill, Jr. | F21S 8/026 |
| 2003/0210546 | A1 * | 11/2003 | Chin | F21V 21/02 362/235 |
| 2006/0198127 | A1 | 9/2006 | Lippis | |
| 2006/0262521 | A1 * | 11/2006 | Piepgras | E04B 9/006 362/149 |
| 2010/0079983 | A1 * | 4/2010 | Kumamoto | F21V 13/10 362/147 |
| 2010/0135020 | A1 | 6/2010 | Moore | |
| 2010/0246176 | A1 * | 9/2010 | Shyu | F21V 5/007 362/235 |
| 2011/0043132 | A1 * | 2/2011 | Kim | F21S 8/026 315/294 |
| 2011/0219718 | A1 | 9/2011 | Gerkes et al. | |
| 2012/0051041 | A1 | 3/2012 | Edmond et al. | |
| 2012/0162982 | A1 * | 6/2012 | Wang | F21V 15/013 362/235 |
| 2012/0236537 | A1 * | 9/2012 | Pickard | F21V 7/0008 362/84 |
| 2012/0236597 | A1 * | 9/2012 | Liao | F21S 2/005 362/612 |
| 2012/0250301 | A1 * | 10/2012 | Tung | F21V 31/00 362/223 |
| 2013/0027915 | A1 | 1/2013 | Caferro et al. | |
| 2013/0063948 | A1 * | 3/2013 | Ishii | F21S 8/026 362/294 |
| 2013/0107518 | A1 * | 5/2013 | Boyer | F21V 29/004 362/235 |
| 2013/0107527 | A1 | 5/2013 | Boyer et al. | |
| 2013/0176716 | A1 | 7/2013 | Pratt et al. | |
| 2013/0250567 | A1 | 9/2013 | Edmond et al. | |
| 2013/0265772 | A1 | 10/2013 | Lu et al. | |
| 2013/0286637 | A1 | 10/2013 | Lay et al. | |
| 2013/0294053 | A1 | 11/2013 | Marquardt et al. | |
| 2013/0335962 | A1 | 12/2013 | Wu et al. | |
| 2014/0003047 | A1 * | 1/2014 | Shimizu | F21V 7/0008 362/311.03 |
| 2014/0036503 | A1 | 2/2014 | Olsen | |
| 2014/0167065 | A1 | 6/2014 | Bergmann et al. | |
| 2014/0168065 | A1 | 6/2014 | Huang et al. | |
| 2014/0233228 | A1 * | 8/2014 | Komiyama | F21S 8/04 362/235 |
| 2014/0268721 | A1 | 9/2014 | Durkee et al. | |
| 2015/0233533 | A1 * | 8/2015 | Van Es | F21K 9/175 313/49 |
| 2015/0276125 | A1 | 10/2015 | Pratt et al. | |
| 2016/0116136 | A1 | 4/2016 | Bernard et al. | |
| 2016/0369972 | A1 * | 12/2016 | Thijssen | F21V 7/22 |

FOREIGN PATENT DOCUMENTS

| | | | | |
|---|---|---|---|---|
| EP | 1030100 | A2 * | 8/2000 | E04B 9/001 |
| EP | 2650599 | | 10/2013 | |
| EP | 2650599 | A1 * | 10/2013 | F21S 4/20 |

OTHER PUBLICATIONS

Author Unknown, "Cree XLamp MP-L EasyWhite LEDs," Product Family Data Sheet, 2015, Cree Inc., 14 pages.
Examination Report for German Patent Application No. 112015004502.3, mailed May 25, 2018, 12 pages.
Examination Report for German Patent Application No. 112015004502.3, mailed Feb. 10, 2021, 9 pages.
International Search Report and Written Opinion for International Patent Application No. PCT/US2015/057649, mailed Dec. 17, 2015, 12 pages.
Non-Final Office Action for U.S. Appl. No. 14/526,368, mailed Jul. 28, 2016, 16 pages.
Final Office Action for U.S. Appl. No. 14/526,368, mailed Feb. 2, 2017, 20 pages.
Non-Final Office Action for U.S. Appl. No. 14/526,368, mailed Sep. 8, 2017, 19 pages.
Final Office Action for U.S. Appl. No. 14/526,368, mailed Mar. 2, 2018, 19 pages.
Non-Final Office Action for U.S. Appl. No. 14/526,368, mailed Feb. 8, 2019, 18 pages.
Final Office Action for U.S. Appl. No. 14/526,368, mailed Nov. 13, 2019, 20 pages.
Advisory Action for U.S. Appl. No. 14/526,368, mailed Feb. 4, 2020, 3 pages.
Non-Final Office Action for U.S. Appl. No. 14/526,368, mailed May 5, 2020, 8 pages.
Final Office Action for U.S. Appl. No. 14/526,368, mailed Sep. 15, 2020, 11 pages.
Applicant-Initiated Interview Summary for U.S. Appl. No. 14/526,368, mailed Nov. 3, 2020, 4 pages.
Non-Final Office Action for U.S. Appl. No. 14/526,368, mailed Dec. 10, 2020, 10 pages.
Notice of Allowance for U.S. Appl. No. 14/526,368, mailed Apr. 19, 2021, 10 pages.
Final Office Action for U.S. Appl. No. 14/622,821, mailed Nov. 8, 2017, 23 pages.
Non-Final Office Action for U.S. Appl. No. 14/622,821, mailed May 19, 2017, 22 pages.
Non-Final Office Action for U.S. Appl. No. 14/622,821, mailed Jan. 3, 2019, 23 pages.
Final Office Action for U.S. Appl. No. 14/622,821, mailed Jul. 22, 2019, 24 pages.
Advisory Action for U.S. Appl. No. 14/622,821, mailed Dec. 12, 2019, 3 pages.
Notice of Allowance for U.S. Appl. No. 14/622,821, mailed Feb. 21, 2020, 8 pages.
Non-Final Office Action for U.S. Appl. No. 15/930,015, mailed Nov. 16, 2021, 16 pages.
U.S. Appl. No. 12/873,303, filed Aug. 31, 2010, Edmond, et al.
U.S. Appl. No. 13/464,745, filed May 4, 2012, Pratt, et al.
U.S. Appl. No. 13/442,311, filed Apr. 9, 2012, Lu, et al.
U.S. Appl. No. 13/168,689, filed Jun. 24, 2011, Bergmann, et al.
Cree LMR4 LED Module with TrueWhite® Technology. Product Family Data Sheet. CLM-DS01 LMR4 Rev 6A. Copyright 2011-2014 Cree. Inc.. 4600 Silicon Dr., Durham, NC 27703, www.cree.com.
Cree XLamp MP-L EasyWhite® LEDs. Product Family Data Sheet, Copyright 2010-2015 Cree. Inc., 4600 Silicon Dr., Durham, NC 27703, www.cree.com.
International Search Report and Written Opinion from European Patent Appl. No. PCT/US2015/057649. dated Dec. 17, 2015.
International Preliminary Report for International Application No. PCT/US2015/057649; dated May 11, 2017.
Office Action for U.S. Appl. No. 14/622,821; dated Nov. 8, 2017.

* cited by examiner

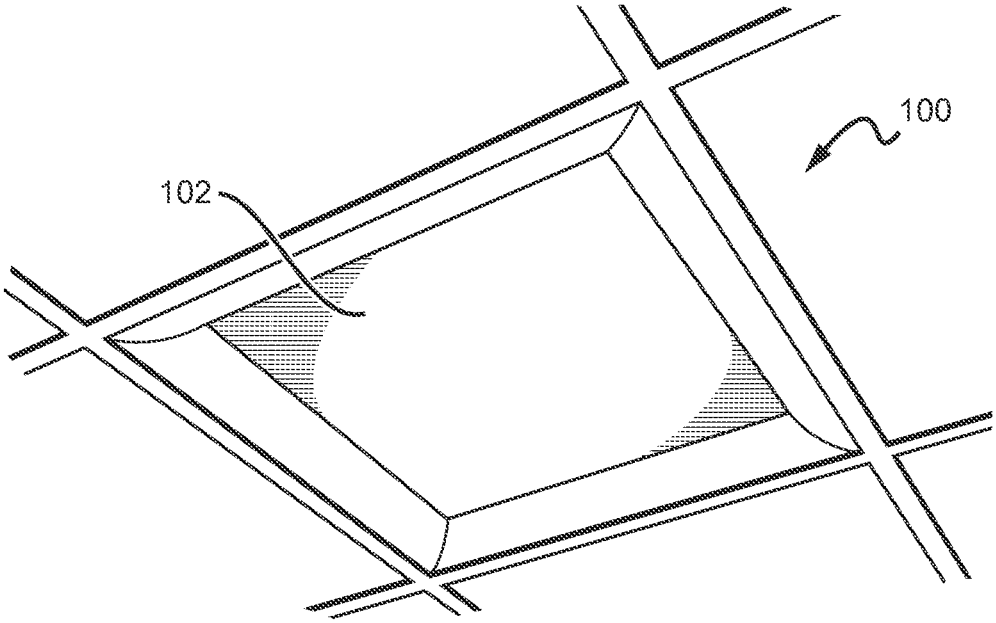
FIG. 1
FIG. 2
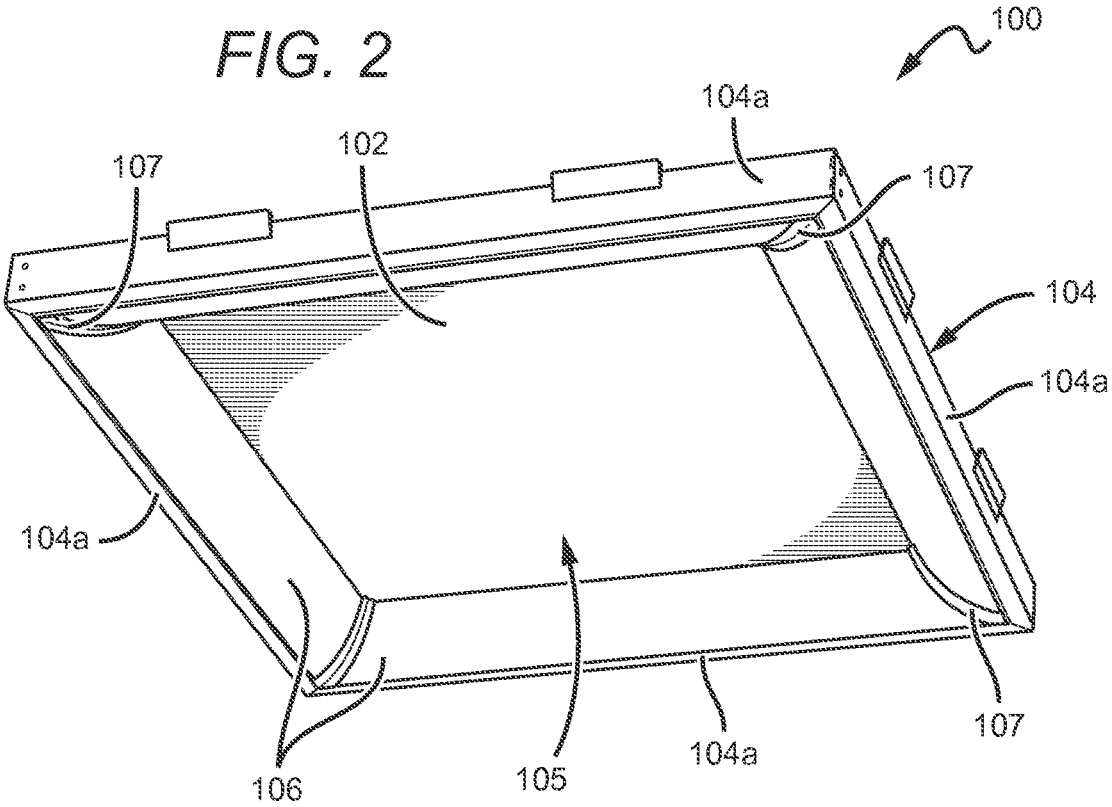

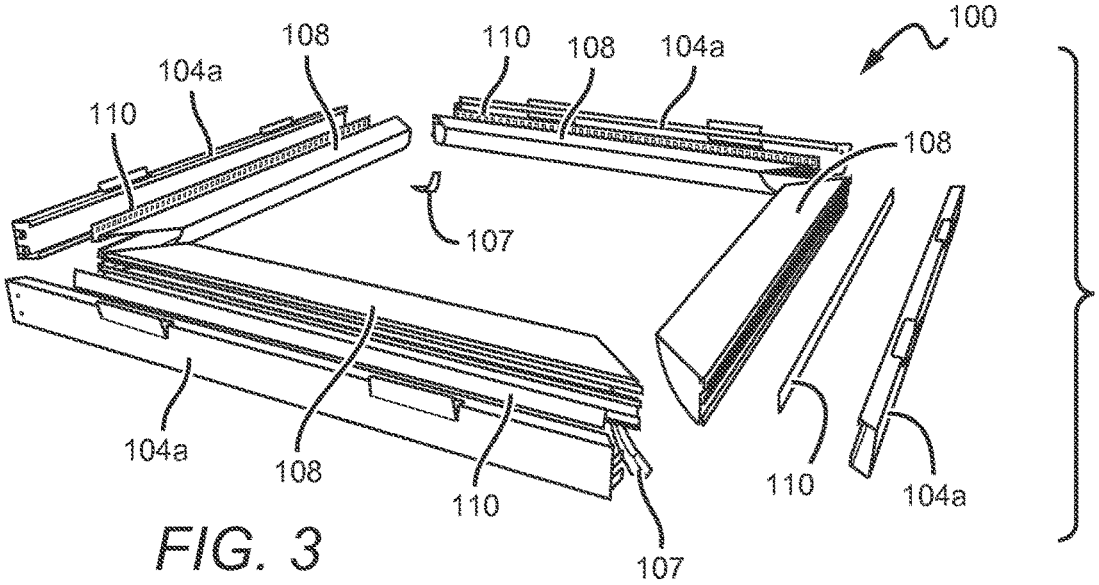
FIG. 3
FIG. 4
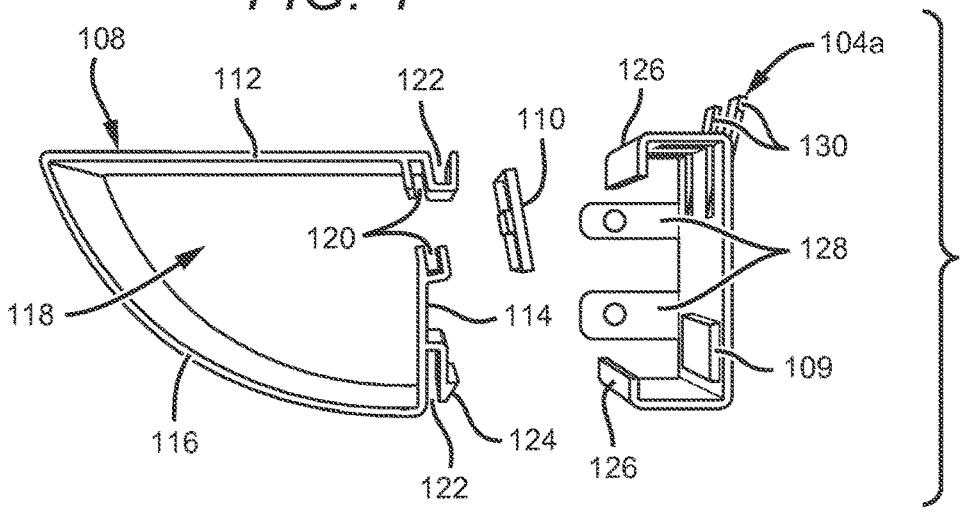
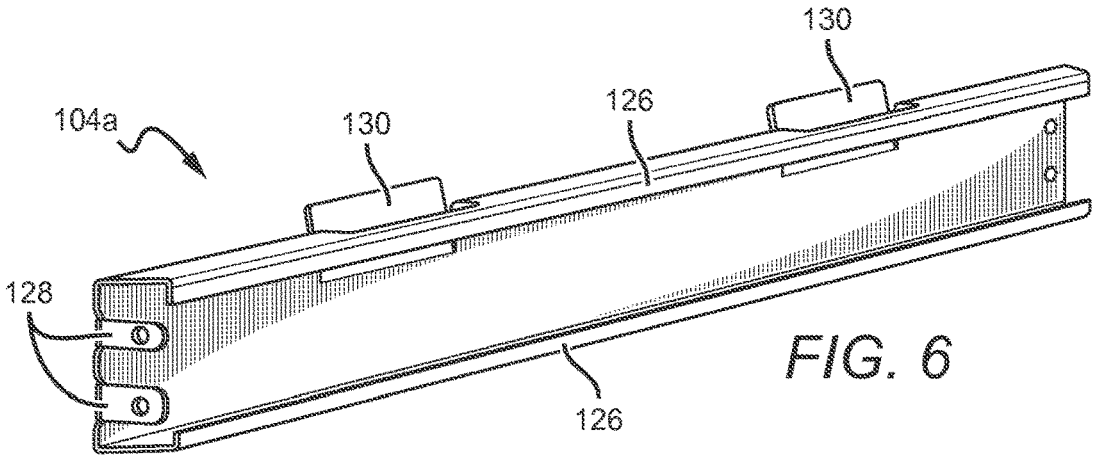
FIG. 6

FIG. 5
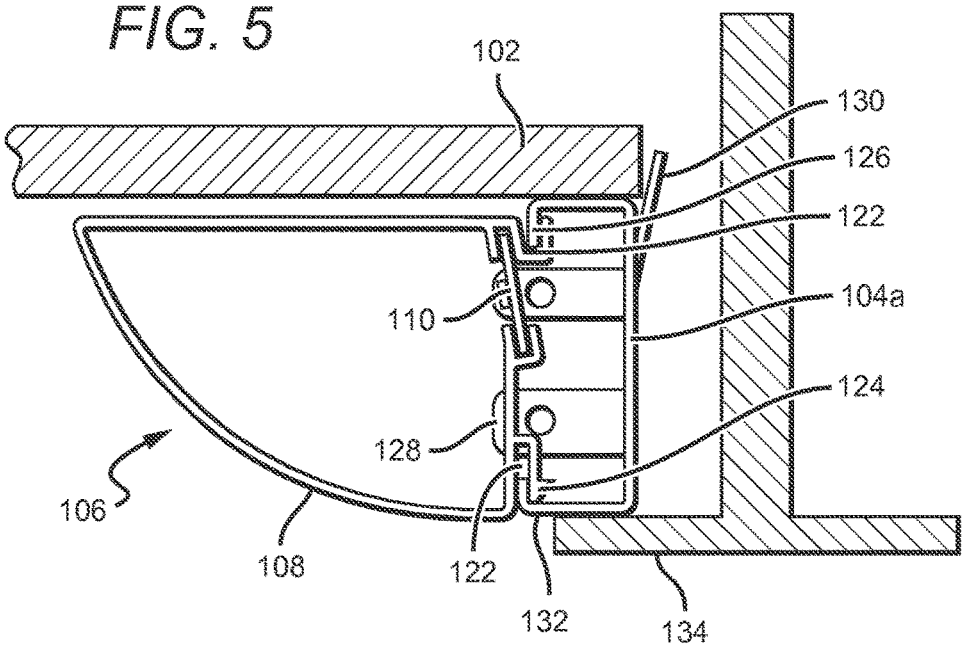
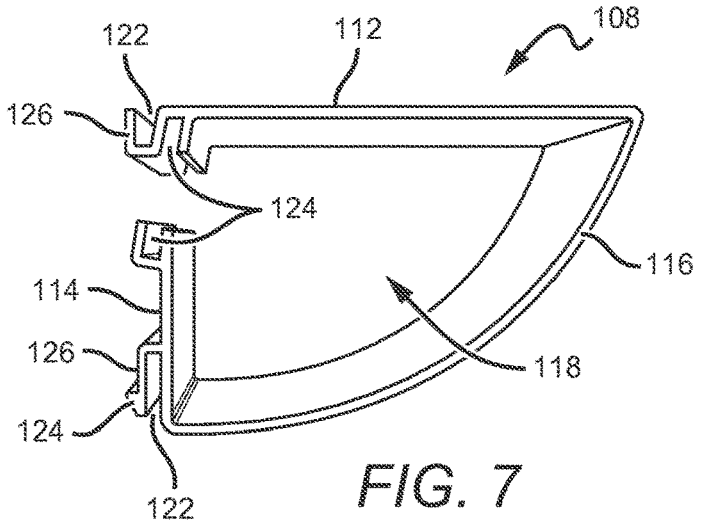
FIG. 7
FIG. 8
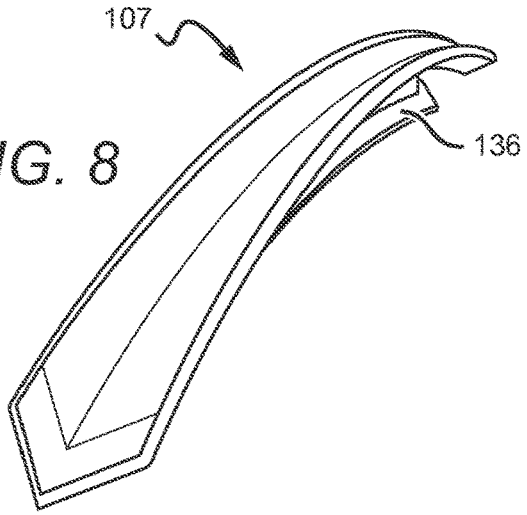

FIG. 9
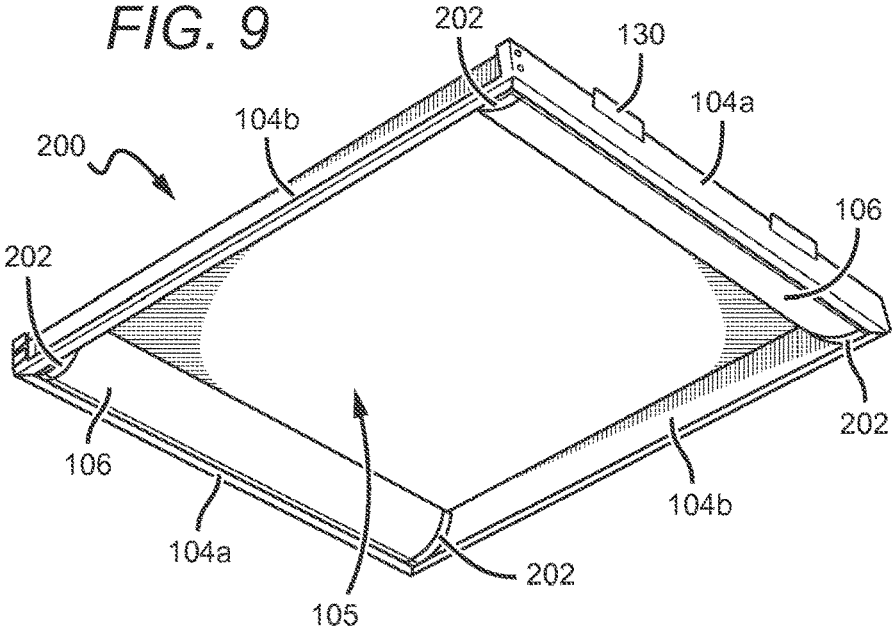
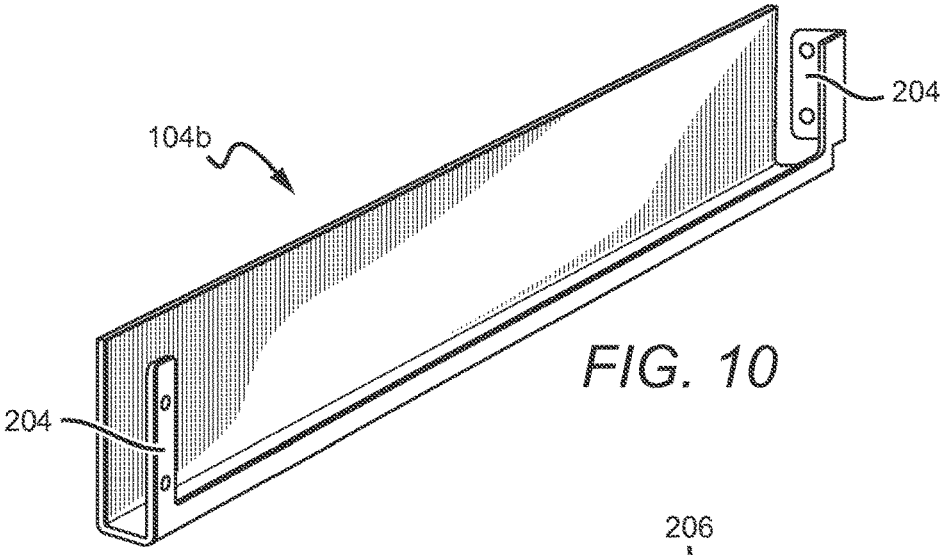
FIG. 10
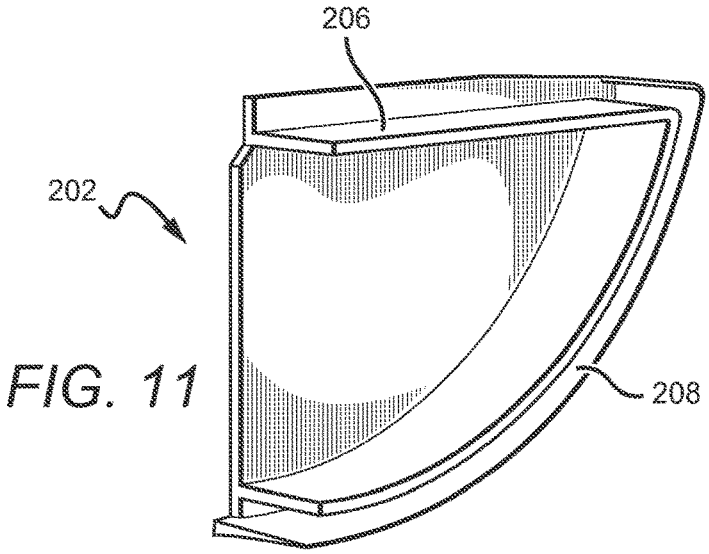
FIG. 11

FIG. 18
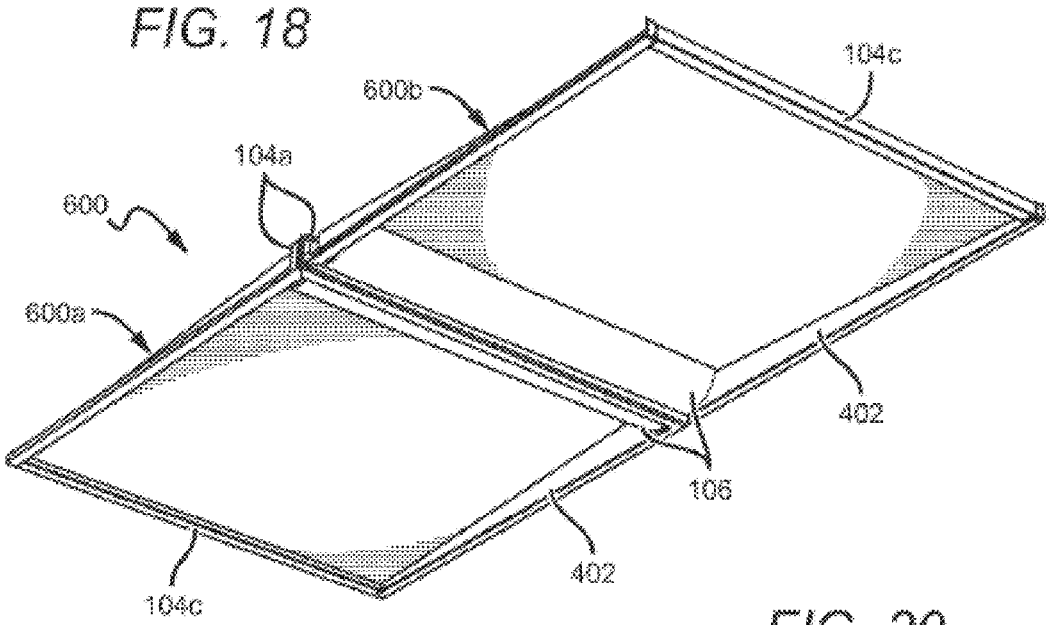
FIG. 20
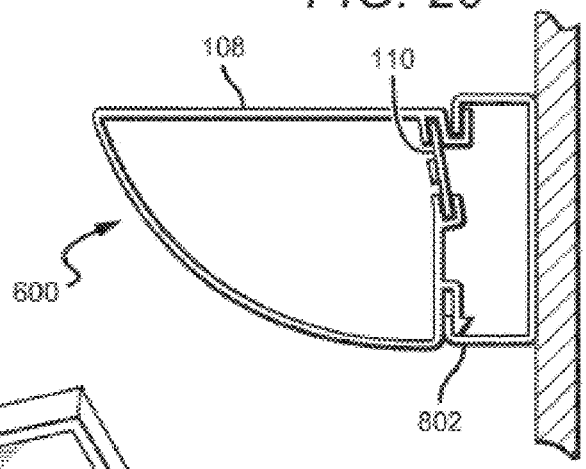
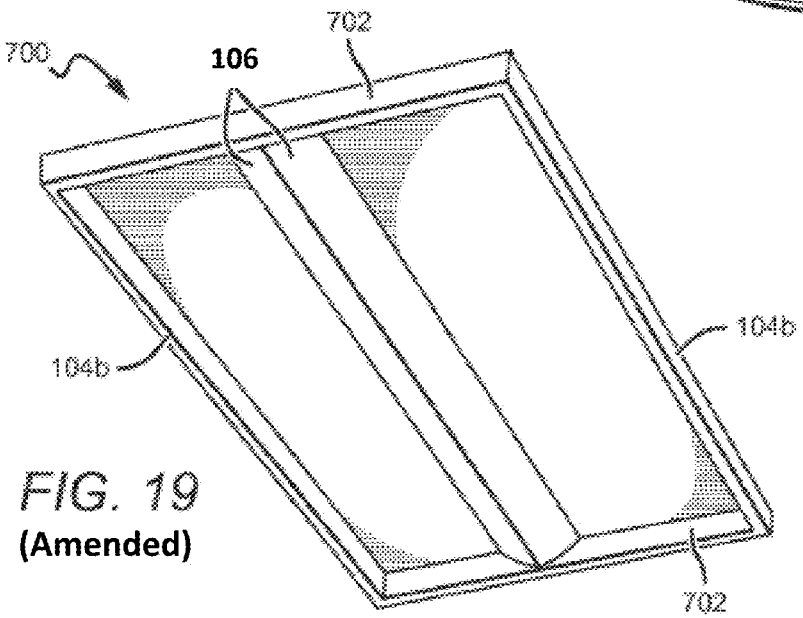
FIG. 19
(Amended)

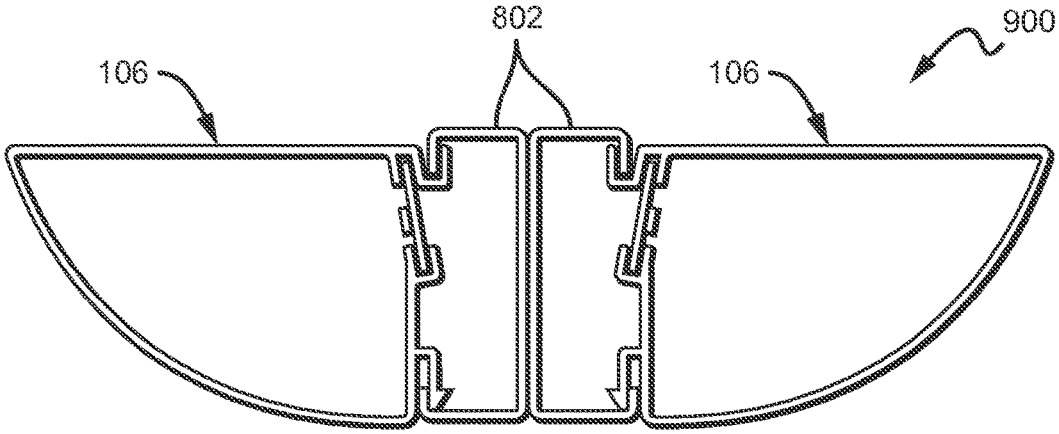
FIG. 21
FIG. 22
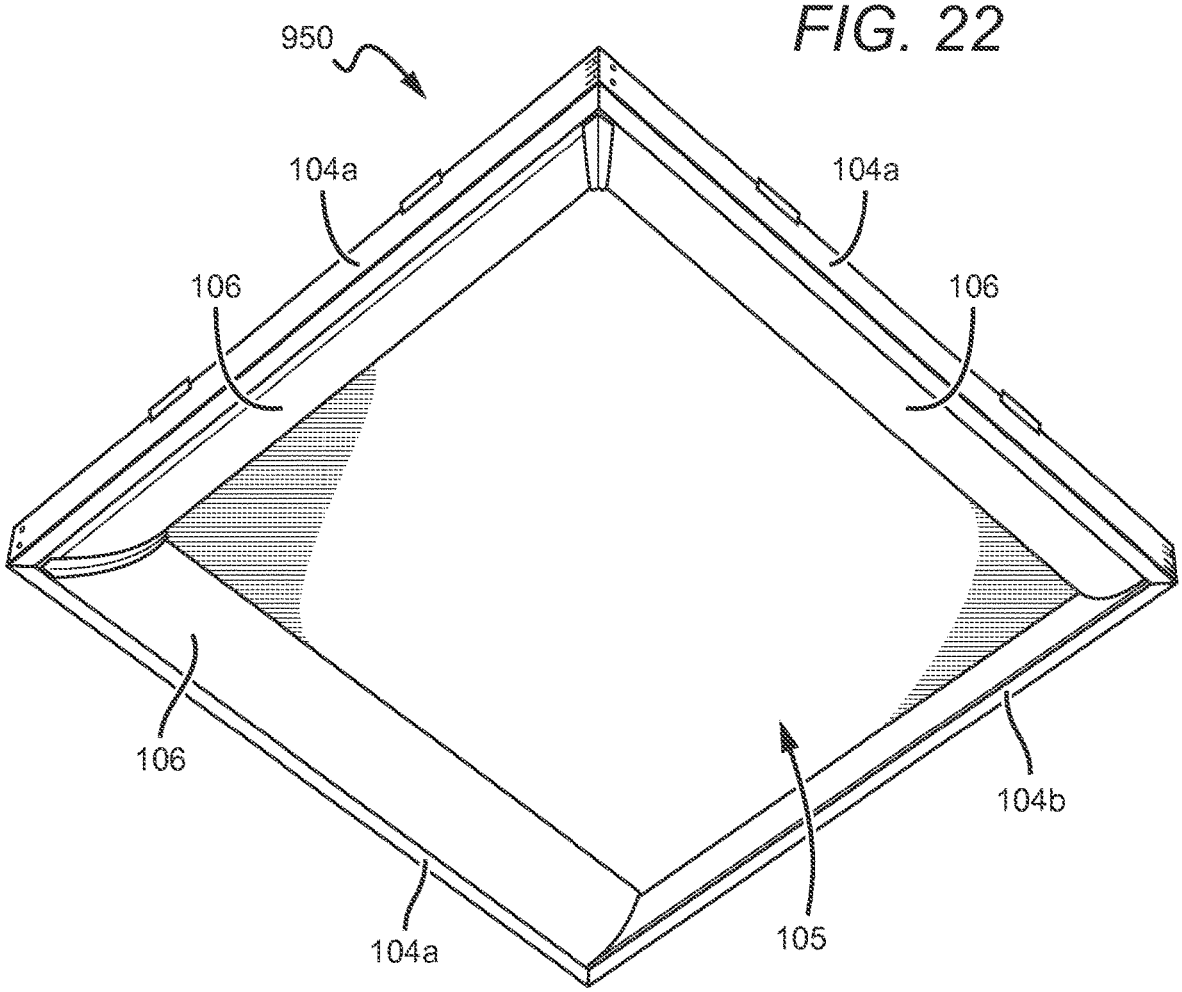

EDGE LIT FIXTURE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*This application is a reissue of U.S. Pat. No. 11,079,076, issued on Aug. 3, 2021, which is incorporated herein by reference in its entirety.*

BACKGROUND OF THE INVENTION

Field of the Invention

The invention relates to retrofit fixtures and systems and methods for lighting installations, and in particular, to fixtures, systems, and methods used to retrofit lighting installations with LED light sources.

Description of the Related Art

Troffer-style fixtures are ubiquitous in commercial office and industrial spaces throughout the world. In many instances these troffers house elongated tubular fluorescent lamps or light bulbs that span the length of the troffer. Troffers may be mounted to or suspended from ceilings, such as by suspension from a "T-grid". Often the troffer may be recessed into the ceiling, with the back side of the troffer protruding into the plenum area above the ceiling. Typically, elements of the troffer on the back side dissipate heat generated by the light source into the plenum where air can be circulated to facilitate the cooling mechanism. U.S. Pat. No. 5,823,663 to Bell, et al. and U.S. Pat. No. 6,210,025 to Schmidt, et al. are examples of typical troffer-style fixtures.

More recently, with the advent of the efficient solid state lighting sources, these troffers have been used with LEDs as their light source. LEDs are solid state devices that convert electric energy to light and generally comprise one or more active regions of semiconductor material interposed between oppositely doped semiconductor layers. When a bias is applied across the doped layers, holes and electrons are injected into the active region where they recombine to generate light. Light is produced in the active region and emitted from surfaces of the LED.

LEDs have certain characteristics that make them desirable for many lighting applications that were previously the realm of incandescent or fluorescent lights. Incandescent lights are energy-inefficient sources with approximately ninety percent of the electricity they consume being released as heat rather than light. Fluorescent light bulbs are more energy-efficient than incandescent light bulbs by a factor of about 10, but are still relatively inefficient compared to LEDs, which can provide the same luminous flux as incandescent and fluorescent lights using a fraction of the energy.

In addition, LEDs can have a significantly longer operational lifetime. Incandescent light bulbs have relatively short lifetimes, with some having a lifetime in the range of about 750-1000 hours. Fluorescent bulbs can also have lifetimes longer than incandescent bulbs, such as in the range of approximately 10,000-20,000 hours, but provide less desirable color. In comparison, LEDs can have lifetimes between 50,000 and 70,000 hours. The increased efficiency and extended lifetime of solid state sources has resulted in widespread adoption of LEDs in place of conventional light sources in many different applications. It is predicted that further improvements will result in their general acceptance in more and more lighting applications. Movement toward universal usage of LEDs in place of incandescent or fluorescent lighting will result in increased lighting efficiency and significant energy saving.

There has been recent interest in upgrading existing troffer-style lighting systems with LED sources (or light engines) to capitalize on the above advantages. Current options for upgrading include complete fixture replacement such as by the commercially available CR Series Architectural LED Troffer, provided by Cree, Inc. Some features of these troffers are described in U.S. patent application Ser. No. 12/873,303, titled "TROFFER-STYLE FIXTURE", and assigned to Cree, Inc. Performing complete fixture replacement can require penetrating the ceiling plenum by a skilled technician. This can be time consuming and expensive, and in many locations, building codes can require that a licensed electrician perform any work in the plenum space above a ceiling.

During the upgrade process, contamination may also be a concern, particularly in a hospital or clean room environment. In upgrade processes where the entire fixture is replaced, the sheet metal pan or housing of an existing troffer lighting system is removed. Removing the "host fixture" pan can generate dust which must be contained and cleaned prior to resuming normal operations within the environment. Preventing dust is of particular concern areas known to contain hazardous building materials, such as asbestos. In certain environments, construction permits may be required for an upgrade process that requires removal of the troffer pan, which can add additional complication and cost.

Another alternative upgrade option is by fixture retrofit where a new LED-based light engine can be installed into the sheet metal pan of an existing troffer lighting system. This can provide the advantage of using light engines with design features such as reflectors, lenses, and power supplies which have been optimized for an LED-based system. It also allows light engines which are approved for use in other applications to be used in a retrofit application. Examples of LED-based retrofit kits are discussed in detail in U.S. patent application Ser. No. 13/464,745, titled "MOUNTING SYSTEM FOR RETROFIT LIGHT INSTALLATION INTO EXISTING LIGHT FIXTURES", now U.S. Pat. No. 10,544,925, which is commonly assigned with the present application to Cree, Inc. and incorporated by reference as if set forth fully herein. Some retrofits do not require the removal of the existing troffer pan prior to installation, with the pan acting as a barrier to the plenum space. Leaving the pan intact during the retrofit process does not disturb wiring connections, insulation, etc., above the ceiling plane. Leaving the pan in place can also allow for work to be performed by non-licensed personnel, which can eliminate costs for work that is required to be performed by licensed electricians. In some current retrofit products, replacement lamps or LED light engines are held into the existing fixture or sheet metal pan with brackets and screws. Some of these arrangements may require penetrating the ceiling, and some of these installations can be slow and labor-intensive.

Other upgrades involve replacing the fluorescent light bulbs/tubes with replacement tubes having LEDs along their length. This upgrade can utilize existing fluorescent lamp fixtures including the electrical ballast and wiring. However, compared to light engines designed to capitalize on the characteristics of LEDs, these replacement lamps can require much more energy for a given light output (lower efficacy), provide little to no cost benefit. In addition, the tubular format relies on the existing optical reflectors and lenses, which were designed for the light distribution characteristics of a fluorescent source.

SUMMARY OF THE INVENTION

One embodiment of a light fixture according to the present invention comprises the following elements. An elongated lens comprises an exit side and is shaped to define an internal optical cavity. An elongated frame is shaped to engage with said lens. A light strip comprises at least one light source mounted thereon, and the light strip is held in place by the lens such that at least some light emitted from the at least one light source is emitted into the optical cavity and impinges on the exit side of the lens.

One embodiment of a light fixture according to the present invention comprises the following elements. At least one light panel, each of the light panels comprising: an elongated lens comprising an exit side, the lens shaped to define an internal optical cavity, and a light strip comprising at least one light source mounted thereon. The light strip is positioned such that at least some light emitted from the at least one light source is emitted into the optical cavity and impinges on the exit side. A housing comprises at least one lens frame for supporting the at least one light panel.

One embodiment of an elongated lens according to the present invention comprises: a first structural side; a second structural side; and a light-transmissive exit side spanning between an end of the first structural side and an end of the second structural side. The first structural side, the second structural side, and the exit side define an internal optical cavity. Ends of the first and second structural sides distal to the exit side are cooperatively shaped to form a slot for receiving a light strip.

One embodiment of a light fixture comprises the following elements. A housing defines an open central area. At least one light panel is on an interior surface of the housing such that the at least one light panel is positioned to emit at least some light toward the central area.

One embodiment of a light fixture configured for use in a ceiling space comprises the following elements. A housing is provided for placement along at least one side of a perimeter of an opening in the ceiling. At least one light panel is attached to the housing, the light panel only along the perimeter of the opening.

These and other further features and advantages of the invention would be apparent to those skilled in the art from the following detailed description, taken together with the accompanying drawings, in which:

BRIEF DESCRIPTION OF THE DRAWINGS

FIG. 1 is a perspective view of a light fixture according to an embodiment of the present invention.

FIG. 2 is a perspective view of a fixture according to an embodiment of the present invention.

FIG. 3 is an exploded view of a fixture according to an embodiment of the present invention.

FIG. 4 is an exploded view of light panel and a lens frame according to an embodiment of the present invention.

FIG. 5 is a cross sectional view of one side of a fixture according to an embodiment of the present invention.

FIG. 6 is a perspective view of the lens frame which may be used in embodiments of the present invention.

FIG. 7 is a close-up perspective view of one end of an elongated lens which may be used in embodiments of the present invention.

FIG. 8 is a close-up perspective view of an angled joint cap that may be used in embodiments of the present invention.

FIG. 9 is a perspective view of a fixture according to an embodiment of the present invention.

FIG. 10 is a close-up perspective view of a side frame that may be used in embodiments of the present invention.

FIG. 11 is a close-up perspective view of an end cap that may be used in embodiments of the present invention.

FIG. 18 is a perspective view of a modular fixture according to an embodiment of the present invention.

FIG. 19 is a perspective view of another fixture according to an embodiment of the present invention.

FIG. 20 is a cross-sectional view of a fixture according to an embodiment of the present invention.

FIG. 21 is a cross-sectional view of a fixture according to an embodiment of the present invention.

FIG. 22 is a perspective view of a fixture according to an embodiment of the present invention.

DETAILED DESCRIPTION OF THE INVENTION

Figure 12:
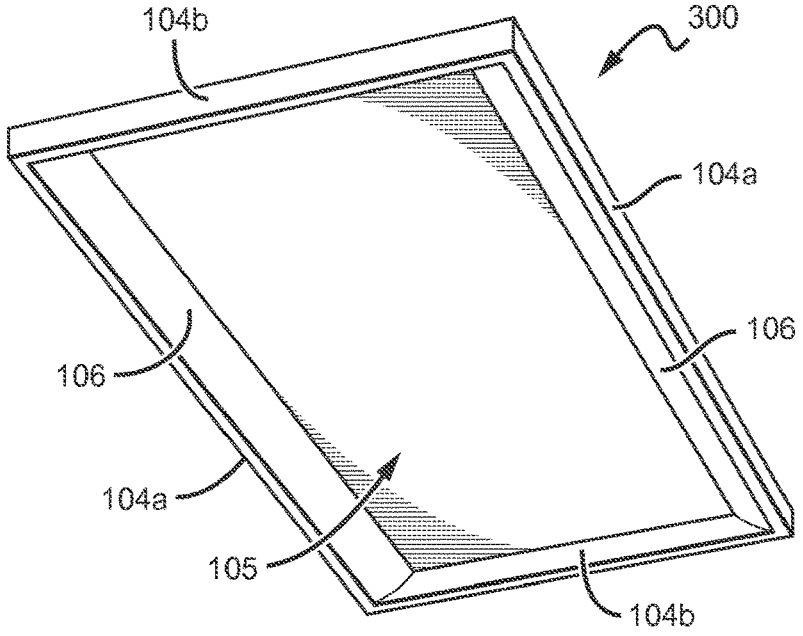
FIG. 12 is a perspective view of a fixture according to an embodiment of the present invention.

Embodiments of the present invention provide edge lit fixture systems that can be used with different light fixtures, but that are particularly adapted for use with common ceiling structures. These fixture systems can be used with many different light sources but are particularly well-suited for use with solid state light sources such LEDs. Some embodiments of the present invention comprise a mechanical mounting system for installing an LED light source within an existing lighting system housing or pan, such as a troffer pan, without penetrating the ceiling plenum. Other embodiments may be installed in typical commercial tile ceiling that utilize a T-grid infrastructure.

By leaving the existing ceiling tile in place, embodiments of the present invention can utilize the existing material to function as an illuminated back surface and a barrier to the plenum. Thus, embodiments of the light fixture can be installed around existing materials, reducing the amount and cost of materials necessary for installation.

The spacing between the vertical members of the T-grid is usually consistent in commercial and industrial buildings. By taking advantage of this regularity, a framing system can be used to create a means to attach a lens or fixtures to a large number of T-Grid ceilings. Some embodiments of the present invention can comprise components, inserts, panels or mounts arranged on and spanning across the ceiling T-grid, to form a housing frame and fixture for a light source. In some embodiments, a housing can rest on the horizontal lip of the T-grid, at least partially spanning the T-grid opening to provide a structure to support the light source, for example, an LED-based light panel. In some of these embodiments, the housing can be located in and supported directly by the ceiling T-grid. Embodiments of the fixtures can be erected quickly and easily without requiring tools, fasteners or adhesives, but it is understood that in other embodiments they can be used.

Some embodiments of the present invention comprise a housing that rests on or is attached to the horizontal portion of a T-grid. The housing defines the fixture area, which in some embodiments is rectangular, for example, 2 ft. by 2 ft. Other embodiments may have different dimensions, such as 2 ft. by 4 ft. or 1 ft. by 4 ft., for example. The housing comprises at least one lens frame for supporting a linear lens. In some embodiments, the housing can be constructed from collapsible housing subassemblies. For example, a rectangular housing may be assembled from first and second collapsible housing subassemblies that pivot about a hinge and lock together to create a rigid housing. The housing comprises at least one elongated lens frame, with each lens frame supporting a light panel. The housing may also comprise side frames and end frames to give the housing its shape, for example, a rectangular shape. Each light panel comprises an elongated lens and a light strip held in place by the lens.

Embodiments of the present invention require minimal material, especially sheet metal, and are easily collapsible such that they can fit into smaller cartons for shipping. Some of the fixtures described herein fit into shipping cartons that are roughly 1/10 the size of cartons used to ship current products on the market that perform a similar function with a comparable form factor. The unassembled products may be shipped to customers for assembly into a variety of configurations depending on the desired application. Thus, embodiments of the present invention provide a versatile light fixture in which unnecessary materials have been eliminated, reducing costs both associated with the materials themselves and with shipping those materials.

The present invention is described herein with reference to certain embodiments, but it is understood that the invention can be embodied in many different forms and should not be construed as limited to the embodiments set forth herein. In particular, the present invention is described below in regards to certain fixture systems that can be used to retrofit and/or upgrade troffer-style fixtures or lighting systems, but it is understood that the system can be used to retrofit and/or upgrade other types of lighting systems as well. The retrofit systems can also be used with many different light systems, sources, panels, and engines beyond those described herein, with many being LED-based.

It is understood that when an element can be referred to as being "on" another element, it can be directly on the other element or intervening elements may also be present. Furthermore, relative terms such as "inner", "outer", "upper", "above", "lower", "beneath", and "below", and similar terms, may be used herein to describe a relationship of one element to another. It is understood that these terms are intended to encompass different orientations of the device in addition to the orientation depicted in the figures.

Although the ordinal terms first, second, etc., may be used herein to describe various elements, components, regions and/or sections, these elements, components, regions, and/or sections should not be limited by these terms. These terms are only used to distinguish one element, component, region, or section from another. Thus, unless expressly stated otherwise, a first element, component, region, or section discussed below could be termed a second element, component, region, or section without departing from the teachings of the present invention.

As used herein, the term "source" can be used to indicate a single light emitter or more than one light emitter functioning as a single source. For example, the term may be used to describe a single blue LED, or it may be used to describe a red LED and a green LED in proximity emitting as a single source, such as in a light bar, for example. Thus, the term "source" should not be construed as a limitation indicating either a single-element or a multi-element configuration unless clearly stated otherwise.

Embodiments of the invention are described herein with reference to schematic illustrations. As such, the actual thickness of elements can be different, and variations from the shapes of the illustrations as a result, for example, of manufacturing techniques and/or tolerances are expected. Thus, the elements illustrated in the figures are schematic in nature. The illustrations are not intended to illustrate the precise shape or relative size of an element and are not intended to limit the scope of the invention.

FIG. 1 is a perspective view of a light fixture according to an embodiment of the present invention. This particular embodiment is built to fit a rectangular fixture opening in a ceiling have a length-to-width ratio of 1:1, although it is understood that other systems may be designed for openings having other shapes and dimensions. In this embodiment the fixture 100 is recessed into the plenum with a bottom surface of the fixture 100 resting on a horizontal lip of the T-grid. Here, the original ceiling tile 102 remains as a functional part of the light fixture, serving as a reflective back surface of the fixture 100.

FIG. 2 is a perspective view of the fixture 100 removed from the ceiling. A housing 104 is mounted to the ceiling around the perimeter of the ceiling opening. The housing 104 can comprise multiple discrete segments and provides the base structure to which one or more light panels 106 can be attached. In this embodiment, the housing 104 comprises four segments, namely, four lens frames 104a that are arranged along only the perimeter of the fixture 100, defining an open central area 105 inside the housing 104. Thus, this particular fixture 100 is a 2 ft. by 2 ft. fixture with four 2 ft. light panels 106 around the interior perimeter of the fixture. Here, the light panels 106 substantially span the entire interior edge of the perimeter of the ceiling opening. These light panels 106 are shaped and positioned to emit at least some light toward the central area 105 and into the room below. The four light panels 106 are arranged to provide a perimeter-in light distribution that is characterized by an even quadrilateral floor distribution with minimal light output at high angles.

It may be desirable in some applications to paint visible portions of the housing 104. The housing 104 may be painted to match the ceiling environment or a particular color scheme, or it may be painted white to improve reflectivity.

The fixture 100 (and some of the other fixtures discussed herein) illuminates a room from the edge of the T-grid rather than from the center of the fixture, which offers a more uniform output. The central area 105 of inside the fixture 100 remains open. As shown in FIG. 1, an existing ceiling tile 102 may be laid over the top of the fixture 100 such that light that passes through the open space will be reflected back into the room environment. That is, the ceiling tile 102 may be used as a reflective back surface. In some embodiments, it may be desirable to dispose a reflective sheet or panel between the housing 104 and the ceiling tile 102 to provide or more reflective back surface, especially if the ceiling tile 102 is a poor reflector. In other embodiments, other materials may be used between the housing 104 and the ceiling tile 102 such as gels, filters, or diffusers, for example. These materials may be employed as lay-ins, or they may be applied directly to a surface of the ceiling tile 102 or another surface.

In this rectangular configuration, the light panels 106 abut one another at their ends in a mitered corner. An angled joint cap 107 is positioned at each joint to finish the lens and create a more visually appealing transition between the light panels 106. As noted, the ceiling tile 102 can remain as a functional component in the fixture 100, for example, as a reflective illuminated surface. The housings of other embodiments disclosed herein have additional types of frame components, such as side frames and end frames, for example.

FIG. 3 is an exploded view of the fixture 100. As shown, the housing 104, which in this embodiment comprises four lens frames 104a arranged in a rectangular configuration, defines the perimeter of the structure. Other embodiments include different types of housing segments including side frames 104b and end frames 104c (neither shown in FIG. 3). The modular versatility of the housing 104 assembly allows fixtures to be arranged in a variety of configurations, several of which are discussed herein. The light panels 106 are mounted to the interior-facing portion of the lens frames 104a. Each light panel 106 comprises an elongated lens 108 and a light strip 110 which is held in place by the lens 108 as best shown in FIG. 5.

FIG. 4 is an exploded view of light panel 106 (i.e., the lens 108 and the light strip 110) and the lens frame 104a. The lens comprises first and second structural sides 112, 114 and a light-transmissive exit side 116. The three sides 112, 114, 116 define a partially enclosed interior optical cavity 118. The distal ends of the structural sides 112, 114 (i.e., the ends not joined to the exit side 116) are cooperatively shaped to form a slot 120 that receives the light strip 110. The light strip 110 may be slid into the slot 120 prior to or after fastening the lens 108 to the lens frame 104a, providing for easy maintenance or replacement of the light strip 110 or individual sources thereon. The first and second structural sides also comprise flanges that define channels 122 for receiving the lens frame 104a. The flange on the second structural side 114 comprises a barbed leg 124 for snap-fit attachment to the lens frame 104a.

In some embodiments, the light strips 110 can comprise a linear array of light emitting diodes (LEDs), although it is understood that other light sources can also be used. Each of the LEDs can emit light with the same characteristics, such as emission intensity, color temperature, and color rendering index. This can result in the particular fixture emitting a substantially uniform emission, with the many industrial, commercial, and residential applications calling for fixtures emitting white light.

In some embodiments, a multicolor source is used to produce the desired light emission, such as white light, and several colored light combinations can be used to yield white light. For example, as discussed in U.S. Pat. Nos. 7,213,940 and 7,768,192, both of which are assigned to Cree, Inc., and both of which are incorporated herein by reference, it is known in the art to combine light from a blue LED with wavelength-converted yellow light to yield white light with correlated color temperature (CCT) in the range between 5000K to 7000K (often designated as "cool white"). Both blue and yellow light can be generated with a blue emitter by surrounding the emitter with phosphors that are optically responsive to the blue light. When excited, the phosphors emit yellow light which then combines with the blue light to make white. In this scheme, because the blue light is emitted in a narrow spectral range it is called saturated light. The yellow light is emitted in a much broader spectral range and, thus, is called unsaturated light.

Another example of generating white light with a multicolor source comprises combining the light from green and red LEDs. RGB schemes may also be used to generate various colors of light. In some applications, an amber emitter is added for an RGBA combination. The previous combinations are exemplary; it is understood that many different color combinations may be used in embodiments of the present invention. Several of these possible color combinations are discussed in detail in U.S. Pat. No. 7,213,940 to van de Ven et al.

Other light sources can comprise series or clusters having two blue-shifted-yellow LEDs ("BSY") and a single red LED ("R"). BSY refers to a color created when blue LED light is wavelength-converted by a yellow phosphor. BSY and red light, when properly mixed, combine to yield light having a "warm white" appearance. These and other color combinations are described in detail in the previously incorporated patents to van de Ven (U.S. Pat. Nos. 7,213,940 and 7,768,192). The light sources according to the present invention can use a series of clusters having two BSY LEDs and two red LEDs that can yield a warm white output when sufficiently mixed.

The light sources can be arranged to emit relatively even emission with different luminous flux, with some embodiments having light sources that combine to emit at least 100 lumens, while other embodiments can emit at least 200 lumens. In still other embodiments the lighting sources can be arranged to emit at least 500 lumens. Some embodiments may include Cree EasyWhite@ LEDs in combination with an analog driver. Other embodiments may include Cree TrueWhite® LEDs with a digital driver that allows the light output to be tuned/dimmed.

In this embodiment, the lens frame 104a has a c-shaped cross section. The lens frame 104a comprises a flanges 126 shaped to mate with the channels 122 of the lens 108. The lens frame 104a also comprises tabs 128 for mounting the fixture to an external surface or for connecting to other housing components. Stops 130 protrude above the top surface of the lens frame 104a to provide a surface for the ceiling tile 102 to rest against, holding it in place above the fixture 100, as best shown in FIG. 5.

FIG. 5 is a cross sectional view of one side of the fixture 100. Here, the light panel 106 is attached to and supported by the lens frame 104a. The flanges 126 of the lens frame 104a are mated with the channels 122 of the lens 108. The barbed leg 124 may engage with a hole on the lens frame 104a (not shown in FIG. 5) to provide a snap-fit attachment mechanism. This particular fixture 100 is shown recess mounted in a ceiling plenum such that a bottom surface 132 of the housing 104 is resting on a horizontal lip 134 of a ceiling T-grid. It is understood that the fixture 100 can be mounted in other ways including surface mount, suspension mount, or pendant mount, for example. In this embodiment, the cross sections of the other three sides of the fixture 100 are the same.

FIG. 6 is a perspective view of the lens frame 104a which may be used in embodiments of the present invention. In this particular embodiment, the ends of the lens frame 104a are beveled to 45° so that they can attach with adjacent segments of the housing 104 with a miter joint. The c-shaped cross section provides an interior space that can house, for example, the light panel 106, or a driver circuit 109 (digital or analog), and/or various other components. The lens frame 104a may be constructed of various materials, with some suitable materials being sheet metal or polycarbonate (PC), for example.

FIG. 7 is a close-up perspective view of one end of the elongated lens 108 which may be used in embodiments of the present invention. The lens 108 comprises the first and second structural sides 112, 114 and the exit side 116, which join to define the partially enclosed optical cavity 118. The distal ends of the structural sides 112, 114 are cooperatively shaped to form a slot 120 that receives the light strip 110. The first and second structural sides 112, 114 also comprise flanges that define channels 122 for receiving the lens frame 104a. The flange on the second structural side 114 comprises a barbed leg 124 for snap-fit attachment to the lens frame 104a. The lens 108 may be constructed using various materials, with one suitable material being polycarbonate, for example. The lens 108 may be extruded to different lengths to accommodate fixtures of various sizes and configurations. In some embodiments, the lens 108 may include diffusive elements.

The lens 108 performs a dual function; it both protects components within the optical cavity 118 and shapes and/or diffuses the outgoing light. In one embodiment, the lens 108 comprises a diffusive element. A diffusive lens 108 functions in several ways. For example, it can prevent direct visibility of the sources and provide additional mixing of the outgoing light to achieve a visually pleasing uniform source. However, a diffusive exit lens can introduce additional optical loss into the system. Thus, in embodiments where the light is sufficiently mixed internally by other elements, a diffusive exit lens may be unnecessary. In such embodiments, a transparent or slightly diffusive exit lens may be used, or the exit lens may be removed entirely. In still other embodiments, scattering particles may be included in the exit lens 108.

Diffusive elements in the lens 108 can be achieved with several different structures. A diffusive film inlay can be applied to a surface of the exit side 116 of the lens 108. It is also possible to manufacture the lens 108 to include an integral diffusive layer, such as by coextruding the two materials or by insert molding the diffuser onto the exterior or interior surface. A clear lens may include a diffractive or repeated geometric pattern rolled into an extrusion or molded into the surface at the time of manufacture. In another embodiment, the exit lens material itself may comprise a volumetric diffuser, such as an added colorant or particles having a different index of refraction, for example.

In certain embodiments, the lens 108 may be used to optically shape the outgoing beam with the use of microlens structures, for example. Microlens structures are discussed in detail in U.S. patent application Ser. No. 13/442,311 to Lu, et al., now U.S. Pat. No. 9,022,601, which is commonly assigned with the present application to CREE, INC. and incorporated by reference herein.

FIG. 8 is a close-up perspective view of an angled joint cap 107 that may be used in embodiments of the present invention. When assembled, as in fixture 100, angled joint caps 107 are arranged between adjacent light panels 106. The curve of the joint caps 107 mimics the curve of the exit side 116 of the lenses 108 with grooves 136 on both sides to receive the lenses 108. The joint caps 107 are used to finish the lenses 108, preventing light leakage from the ends of the lenses 108 and providing a smooth transition from one light panel 106 to the next. The joint caps 107 also allow for some manufacturing tolerance in the length of the lenses 108 used in the fixture 100. Thus, the lenses 108 may have lengths that slightly deviate from the nominal length and still be incorporated into the assembly without sacrificing visual aesthetics. The joint caps 107 may be constructed from an opaque plastic for example and painted to match components of the housing 104. In other embodiments where the light panels do not abut one another, flat end caps (shown in FIG. 11) may be used to finish the lenses 108 at one or both ends.

FIG. 9 is a perspective view of another fixture 200 according to an embodiment of the present invention. The fixture 200 has many common elements and is similar to the fixture 100 in some respects. For ease of reference, the same reference numerals will be used to identify similar elements throughout the disclosure even though those elements are used in different embodiments. The fixture 200 comprises two light panels 106 arranged at opposite ends of the rectangular housing 104. The light output of the fixture 200 is characterized by an elliptical, symmetrical floor distribution, with the majority of the light along a linear path perpendicular to the lenses 108 and minimal light output at high angles.

In this embodiment, the housing 104 comprises two lens frames 104a and two side frames 104b. The side frames 104b are connected to the lens frames 104a at the respective ends and run there between, providing additional structure and shape to the housing 104. The light panels 106 are supported by the lens frames 104a at both ends and are positioned on the interior side of the housing 104. In this embodiment, flat end caps 202 cover the ends of the lenses 108. The end caps 202 are used to finish the lenses 108, preventing light leakage from the ends of the lenses 108 and providing a gap-filling element between the lenses 108 and the side frames 104b. The end caps 202 also allow for some manufacturing tolerance in the length of the lenses 108 used in the fixture 200.

Within the light panel, the light strip 110 (not shown in FIG. 9) is positioned to emit at least some light toward the exit side 116 of the lens 108. Thus, some of the light will be emitted from the light panel 106 into the room in a direction toward the center of the fixture 200. A smaller portion of the light will be emitted in an upward direction, in some embodiments, toward a ceiling tile 102. The fixture 200 provides an elliptical light output pattern, which is desirable in many environments.

FIG. 10 is a close-up perspective view of a side frame 104b that may be used in embodiments of the present invention. The side frame 104b comprises mount tabs 204 for connecting to lens frames 104a, other side frames 104b, and/or end frames 104c. The side frames 104b add stability to the housing 104 and define the perimeter of the fixture 200.

FIG. 11 is a close-up perspective view of an end cap 202 that may be used in embodiments of the present invention. The flat end caps 202 are used in those embodiments that include a joint between a side frame 104b and a lens frame 104a, such as the fixture 200, for example. The end caps comprise interior and exterior ridges 206, 208 that mimic the contour of the exit side 116 of the lens 108. The exterior and interior ridges 206, 208 define a thin channel that is shaped and sized to receive an end of the lens 108. The end cap 202 may be constructed from an opaque material, such as PC, for example, and painted to match the color of the housing 104.

FIG. 12 is a perspective view of a fixture 300 according to an embodiment of the present invention. The fixture 300 is similar to the fixture 200 in many respects and shares several elements in common. The fixture 300 features a housing with a 2:1 aspect ratio, with the lens frames 104a being twice as long as the side frames 104b. In one embodiment, the lens frames 104a and the light panels 106 attached thereto are 4 ft. long, and the side frames 104b are 2 ft. long. It is understood that the 2:1 aspect ratio is merely exemplary, and that the various components of the fixtures disclosed herein can be adjusted to nearly any dimensions desired. Thus, fixtures according to embodiments of the present invention can be tailored to meet dimensional specifications for many different applications.

Figure 13:
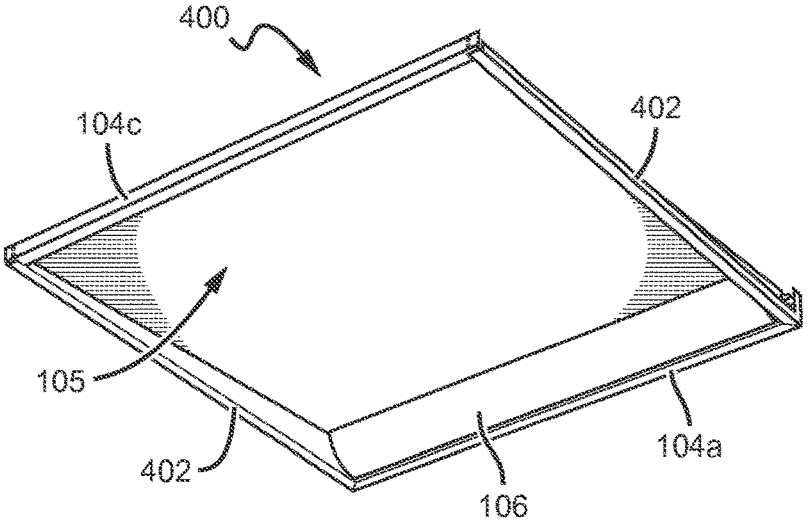
FIG. 13 is a perspective view of a light fixture according to an embodiment of the present invention.

FIG. 13 is a perspective view of a light fixture 400 according to an embodiment of the present invention. The fixture 400 is similar in many respects to the fixture 100 and shares several elements in common. The fixture 400 provides a directional light output that emanates from one side of the fixture 400. Because such fixtures are often mounted near a wall-ceiling junction and can disperse light along a wall, the fixture 400 may sometimes be referred to as a "wall wash" configuration. The light output of the fixture 400 is characterized by an asymmetric elliptical floor distribution with the majority of light directed to one side and minimal light emitted at high angles.

In this embodiment, the housing 104 comprises a lens frame 104a, two angled side frames 402, and an end frame 104c. The light panel 106 is attached to the lens frame 104a on one end of the fixture 400. The angled side frames 400 are connected to the ends of the lens frame 104a and extend out to connect the end frame 104c. Similarly as the fixture 100, the fixture 400 can be recess-mounted in the plenum by resting the bottom surface of the housing on the horizontal lip of a T-grid, in which case the light panel 106 would substantially span the entire interior edge of the perimeter of the ceiling opening. The fixture 400 can also be mounted in other ways such as surface mounting, suspension mounting, and pendant mounting, for example.

Figure 14:
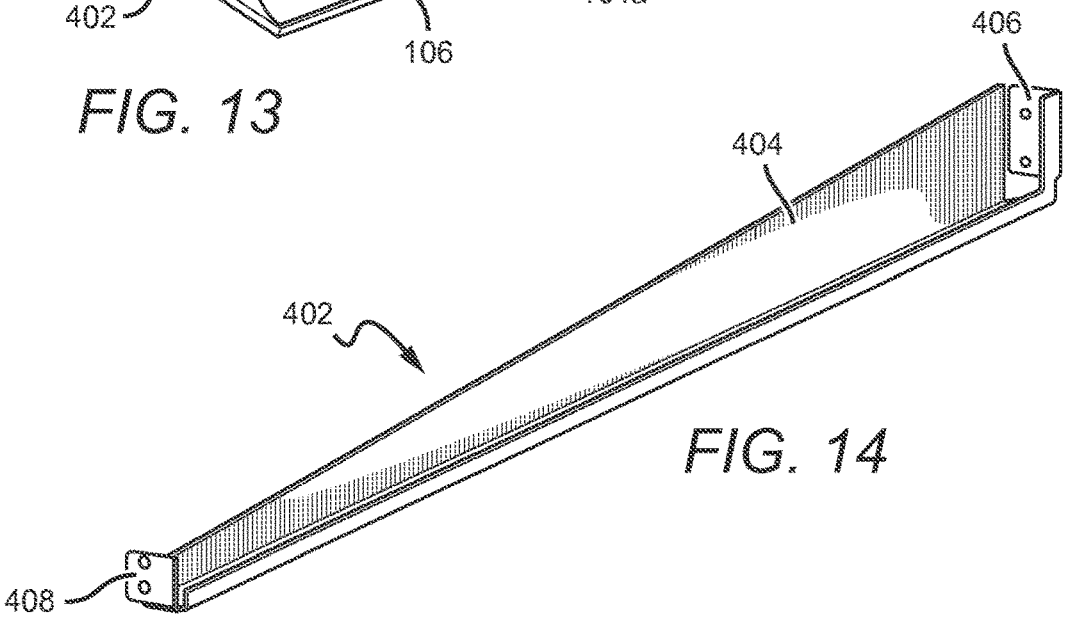
FIG. 14 is a close-up view of an angled side frame that may be used in embodiments of the present invention.

FIG. 14 is a close-up view of an angled side frame 402 that may be used in embodiments of the present invention. The angled side frame 402 is similar to the side frame 104a of fixture 100 except that the angled side frame 402 comprises a vertical portion 404 that tapers down as it extends away from the mount tab 406 on the end where the light panel 106 is disposed. The mount tab 408 at the end opposite the light panel 106 is designed to mount to the end frame 104c to complete the fixture 400.

Figure 15:
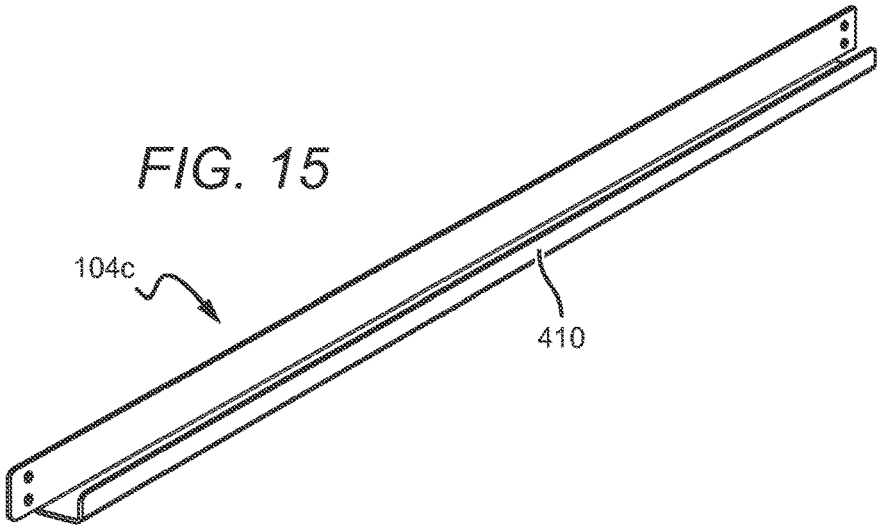
FIG. 15 is a close-up view of the end frame that may be used in embodiments of the present invention.

FIG. 15 is a close-up view of the end frame 104c that may be used in embodiments of the present invention. The end frame 104c is designed to mount at its ends to the angled side frames 402. The end frame 104c comprises a vertical ridge 410 that provides a resting surface for the ceiling tile 102.

Figure 16:
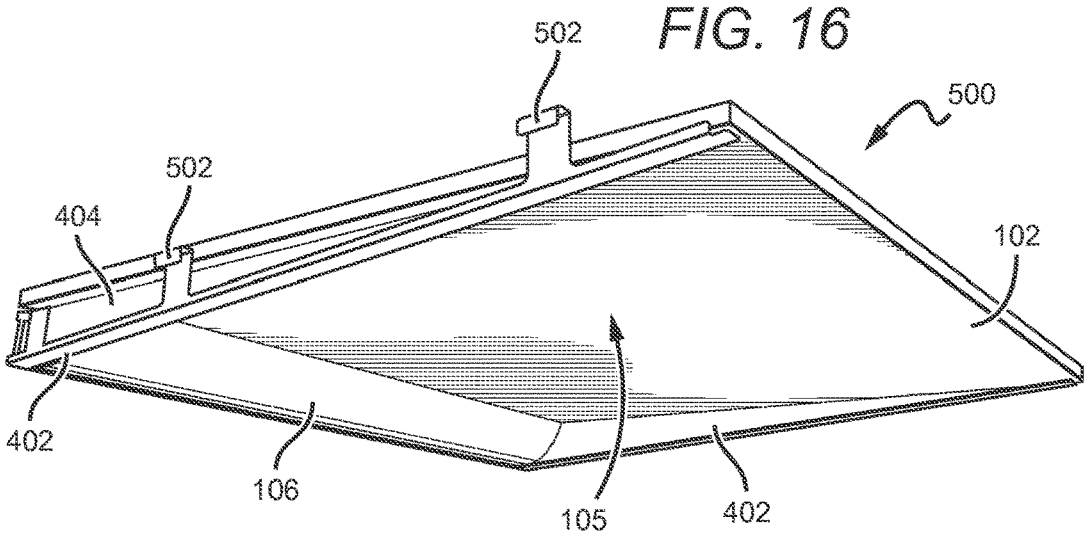
FIG. 16 is a perspective view of a fixture according to an embodiment of the present invention.

FIG. 16 is a perspective view of a fixture 500 according to an embodiment of the present invention. The fixture 500 is similar to the fixture 400 in many respects and shares several common elements. The housing 104 in this embodiment comprises a lens frame 104a and two angled side frames 402 connected at the ends of the lens frame 104a and extending therefrom. These three components of the housing 104 define the open central area 105. Rather than close the housing 104 with an end frame 104c, the side of the housing 104 opposite the light panel 106 is left open in this embodiment. Thus, a ceiling tile 102 can rest on a top surface of the vertical portion 404 of the angled side frames 402 and function as a back surface of the fixture 500. Because the angled side frames 402 taper down as they extend away from the lens frame 104a, a ceiling tile 102 thereon will rest at an angle. Thus, some embodiments may include additional stop tabs (not shown) at the distal ends of the angled side frames 402 to keep the ceiling tile 102 from sliding down the side frames 402 as a result of vibrations. In this embodiment, the angled side frames 404 comprise hooks 502 that connect to an external structure to provide additional support for the fixture 500 and to keep it from moving around in the presence of jolts or vibrations, such as an earthquake, for example. In some embodiments the hooks 502 can hang over the vertical portion of a T-grid. Other kinds of support or fastening mechanisms may also be used to secure the fixture 500 to an external structure.

Figure 17:
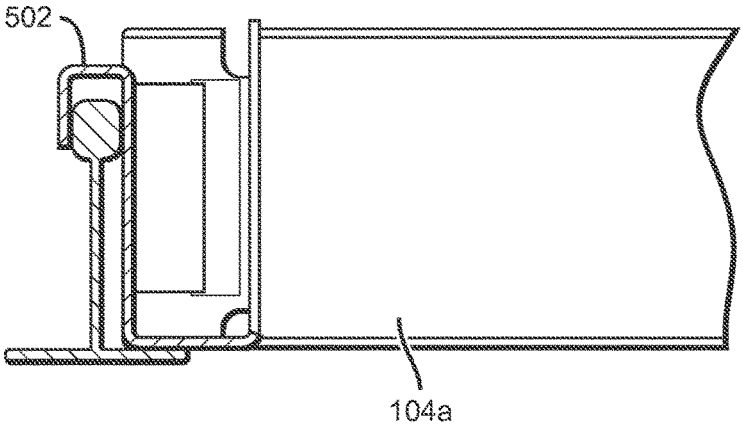
FIG. 17 is a cut-away view of a portion of a fixture according to an embodiment of the present invention.

FIG. 17 is a cut-away view of a portion of the fixture 500. The hook 502 is shown resting over the vertical portion of the T-grid. It is understood that hooks and other fastening mechanisms (e.g., clamps, clips, etc.) can be used in any fixture according to embodiments of the present invention.

FIG. 18 is a perspective view of a modular fixture 600 according to an embodiment of the present invention. In this embodiment, the modular fixture 600 comprises two wall wash type fixtures 600a, 600b, each similar to the fixture 400 in many respects, disposed in a back-to-back arrangement. Here the lens frames 104a of both units are mounted to one another such that the light panels face in opposite directions as shown. It is understood that additional fixtures can be added to the sides or the ends of the modular fixture 600 to achieve a desired light output level or distribution. The fixtures which compose the modular fixture 600 can also be rotated to produce various light output profiles.

FIG. 19 is a perspective view of another fixture 700 according to an embodiment of the present invention. The fixture 700 comprises two light panels 106 mounted directly to one another in a back-to-back configuration. The housing 104 comprises two lens frames 702 and two side frames 104b. In this embodiment, the light panels [102] *106* both connect to the lens frames 702 at a central point and extend away in a perpendicular direction, running between the two lens frames 702. Thus, the fixture 700 provides a center-out light distribution as opposed to a perimeter-in distribution as in fixture 100, for example.

FIG. 20 is a cross-sectional view of a fixture 800 according to an embodiment of the present invention. Similar to the fixture 100, the fixture 800 comprises a light panel [102] *106* (lens 108 and light strip 110) attached to a lens frame 802. Here, the lens frame 802 is adapted to mount directly to a surface, such as a wall, for example. The fixture 800 may be mounted with screws, adhesive, or the like.

FIG. 21 is a cross-sectional view of a fixture 900 according to an embodiment of the present invention. The housing 104 comprises two lens frames 802 mounted to one another in a back-to-back configuration such that the light panels 106 face in opposite directions. The top surfaces or the end surfaces of the lens frames 802 may be adapted to mount directly to a surface, or the fixture 900 may be suspension-mounted or pendant-mounted, for example.

FIG. 22 is a perspective view of a fixture 950 according to an embodiment of the present invention. The fixture 950 is similar in many respects to the fixture 100 and shares several common elements. This particular fixture comprises light panels 106 on three sides of the fixture 950 with each light panel 106 connected to a lens frame 104a. The side frame 104b to provide structure on the single side without a light panel.

It is understood that embodiments presented herein are meant to be exemplary. The different features of the invention can be arranged in many different ways and the installation of the fixtures can be accomplished using many different elements and steps. Embodiments disclosed herein make reference to several structural components that form portions of the housing 104, e.g., lens frames, side frames, and end frames. It is understood that these components can be used in any combination to create variations of the housing which can be used to create many different fixtures.

For example, in another embodiment (not pictured), the entire fixture comprises a light panel attached to a single lens frame, such that the lens frame is the only component of the housing. The housing 104 may sit in the horizontal portion of the T-grid or be attached to an external surface as described herein with respect to similar embodiments. Additionally, the fixtures are not limited to a rectangular shape; the housing may be configured in many different shapes, including triangles and other polygons.

Although the present invention has been described in detail with reference to certain preferred configurations thereof, other versions are possible. Embodiments of the present invention can comprise any combination of compatible features shown in the various figures, and these embodiments should not be limited to those expressly illustrated and discussed. Therefore, the spirit and scope of the invention should not be limited to the versions described above.

We claim:

1. A light fixture for use in an opening in a ceiling grid, the opening having a periphery defined by the ceiling grid, the light fixture comprising:

a housing comprising a plurality of frames connected to one another to define an open central area, wherein the housing comprises a surface configured to be supported by the ceiling grid such that the housing is supported in the opening, the plurality of frames extending at least partially around the periphery of the opening, the plurality of frames comprising at least one lens frame *and further comprising at least one fastening mechanism, wherein the at least one fastening mechanism is configured to connect to a portion of the ceiling grid*;

at least one light panel mounted to the at least one lens frame, the at least one light panel comprising:

an elongated lens comprising a first structural side and a second structural side and a light-transmissive exit side spanning between the first structural side and the second structural side, wherein the first structural side and the second structural side are cooperatively shaped to form a slot for receiving a light strip; and a light strip comprising at least one light source mounted thereon, the light strip held in place by the slot and positioned such that at least some light emitted from the at least one light source is emitted toward the light-transmissive exit side.

2. The light fixture of claim 1, wherein the at least one lens frame comprises two lens frames and the at least one light panel comprises two light panels where the housing is configured in a rectangular shape with the two lens frames on opposite sides of the housing, each of the two lens frames supporting a respective one of the two light panels such that the two light panels are on an interior side of the housing.

3. The light fixture of claim 2, the plurality of frames comprising side frames connected to and extending between the two lens frames.

4. The light fixture of claim 1, wherein the at least one lens frame comprises four lens frames and the at least one light panel comprises four light panels where the housing is configured in a rectangular shape, each of the four lens frames supporting a respective one of the four light panels such that the light panels are on an interior side of the housing.

5. The light fixture of claim 4, further comprising an angled joint cap between adjacent ones of the four light panels.

6. The light fixture of claim 1, wherein the plurality of frames comprises two side frames; wherein the housing is configured in a rectangular shape, the housing comprising:

a first lens frame at a first end of the housing, the first lens frame supporting the at least one light panel such that the at least one light panel faces the interior of the housing; and the two side frames connected to the first lens frame and extending therefrom.

7. The light fixture of claim 6, the housing further comprising an end frame connected to the two side frames opposite the first lens frame.

8. The light fixture of claim 1, wherein the at least one light panel comprises first and second light panels supported by first and second lens frames, the first and second lens frames mounted back-to-back such that the first and second light panels are opposite one another.

9. The light fixture of claim 1, the housing configured in a rectangular shape, the at least one light panel comprising first and second light panels mounted back-to-back, the first and second light panels mounted at their respective ends to first and second lens frames such that the first and second light panels extend perpendicularly between the first and second lens frames.

10. The light fixture of claim 1, wherein the plurality of frames comprises first and second side frames and wherein the at least one lens frame comprises first and second lens frames, the first and second side frames connected to the first and second lens frames and extending therebetween, and the at least one light panel comprising first and second light panels wherein the first and second light panels extend parallel to the first and second side frames through the interior of the housing.

11. The light fixture of claim 1, further comprising at least one end cap over an end of the at least one light panel.

12. The light fixture of claim 1, the housing further comprising at least one hang tab shaped to mount to the ceiling grid.

13. The light fixture of claim 1, the at least one lens frame comprising a c-shaped cross section.

14. A light fixture for use in an opening in a ceiling grid, the opening having a first periphery defined by the ceiling grid, the light fixture comprising:

a housing having an interior defining an open central area having a second periphery, wherein the housing is configured to extend about the first periphery of the opening, and wherein the housing comprises a first surface configured to be mounted on the ceiling grid such that the housing is supported in the opening, wherein the housing comprises a second surface, the second surface configured to support a ceiling tile such that the ceiling tile covers the open central area and is exposed through the open central area, *wherein the housing further comprises at least one fastening mechanism, wherein the at least one fastening mechanism is configured to connect to a portion of the ceiling grid*;

at least one lens supported by the housing and positioned to extend along at least a portion of the open central area at the second periphery of the opening such that the at least one lens does not substantially cover a surface of the ceiling tile that faces the open central area, the at least one lens comprising a light-transmissive exit side that faces the open central area such that light is emitted from the light fixture through the at least one lens below the ceiling tile and into the open central area;

at least one light strip comprising at least one light source for generating light, wherein the at least one light strip is supported directly on the at least one lens and is positioned to extend along a portion of the open central area at the second periphery such that the light emitted by the at least one light source is emitted through the light-transmissive exit side of the at least one lens.

15. The light fixture of claim 14, the housing comprising a plurality of segments.

16. The light fixture of claim 15, wherein each of the at least one light strip and the at least one lens together define a light panel, and further comprising a plurality of light panels, each of the plurality of light panels on an interior surface of one of the plurality of segments such that each of the plurality of light panels is positioned to emit at least some light toward the open central area.

17. The light fixture of claim 14, wherein the housing is configured to rest on a horizontal lip of the ceiling grid.

18. The light fixture of claim 14, further comprising a fastener for fastening the housing to the ceiling grid.

19. The light fixture of claim 14, wherein the at least one light strip is supported by at least one slot formed on the at least one lens.

20. A light fixture configured for use in an opening in a ceiling, the opening having a perimeter, the light fixture comprising:

a housing defining an open central area configured for placement along the opening in the ceiling, the housing comprising a plurality of lens frames extending along the perimeter *and further comprising at least one fastening mechanism, wherein the at least one fastening mechanism is configured to connect to a portion of a ceiling grid*; and a plurality of light panels, each of the plurality of light panels being attached to one of the plurality of lens frames such that the plurality of light panels are positioned along and face the open central area, each of the plurality of light panels comprising first and second structural sides and a light-transmissive exit side spanning between the first structural side and the second structural side, wherein the first and second structural sides retain a light strip;

the light strip comprising at least one light source mounted thereon for emitting light such that at least some light emitted from the at least one light source is emitted toward the light-transmissive exit side;

wherein the plurality of lens frames are connected together to form the housing.

21. The light fixture of claim 20, the plurality of light panels comprising first and second light panels on opposite sides of the opening.

22. The light fixture of claim 20, the housing comprising a surface configured to support a ceiling tile.

*23. The light fixture of claim 1, wherein the at least one fastening mechanism is configured to at least partially encompass a top edge of the ceiling grid.*

*24. The light fixture of claim 14, wherein the at least one fastening mechanism is configured to at least partially encompass a top edge of the ceiling grid.*

*25. The light fixture of claim 20, wherein the at least one fastening mechanism is configured to at least partially encompass a top edge of the ceiling grid.*

*26. The light fixture of claim 1, wherein each fastening mechanism of the at least one fastening mechanism has a first end connected to one frame of the plurality of frames, and a second end terminating in a U-shaped segment, wherein the U-shaped segment is configured to engage a top edge of the ceiling grid.*

*27. The light fixture of claim 14, wherein each fastening mechanism of the at least one fastening mechanism has a first end connected to one frame of the plurality of frames, and a second end terminating in a U-shaped segment, wherein the U-shaped segment is configured to engage a top edge of the ceiling grid.*

*28. The light fixture of claim 20, wherein each fastening mechanism of the at least one fastening mechanism has a first end connected to one frame of the plurality of frames, and a second end terminating in a U-shaped segment, wherein the U-shaped segment is configured to engage a top edge of the ceiling grid.*

* * * * *